United States Patent
Tamura

(10) Patent No.: US 9,646,367 B2
(45) Date of Patent: May 9, 2017

(54) IMAGE PROCESSING APPARATUS AND IMAGE PROCESSING METHOD EACH WITH A FUNCTION OF APPLYING EDGE ENHANCEMENT TO INPUT IMAGE DATA

(71) Applicant: CANON KABUSHIKI KAISHA, Tokyo (JP)

(72) Inventor: Hirokazu Tamura, Chofu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/293,853

(22) Filed: Jun. 2, 2014

(65) Prior Publication Data
US 2014/0369599 A1    Dec. 18, 2014

(30) Foreign Application Priority Data

Jun. 14, 2013 (JP) .................. 2013-126124

(51) Int. Cl.
*G06K 9/34* (2006.01)
*G06T 5/20* (2006.01)
*G06T 5/00* (2006.01)

(52) U.S. Cl.
CPC ............. *G06T 5/20* (2013.01); *G06T 5/003* (2013.01); *G06T 2207/10024* (2013.01); *G06T 2207/20012* (2013.01)

(58) Field of Classification Search
CPC .......... G06T 5/20; G06T 7/408; G06T 7/0085
USPC ........................................... 382/164
See application file for complete search history.

(56) References Cited

U.S. PATENT DOCUMENTS

| | | | |
|---|---|---|---|
| 6,026,184 A * | 2/2000 | Fukushima | G06T 5/20 358/3.08 |
| 6,868,178 B1* | 3/2005 | Frei et al. | 382/162 |
| 2007/0279530 A1* | 12/2007 | Fok | 348/625 |
| 2008/0165182 A1* | 7/2008 | Geelen et al. | 345/419 |
| 2008/0181476 A1* | 7/2008 | Aysal et al. | 382/128 |
| 2010/0182350 A1* | 7/2010 | Fujine | G09G 5/00 345/690 |
| 2010/0290089 A1* | 11/2010 | Stevens | 358/3.06 |
| 2012/0070071 A1* | 3/2012 | Rankin et al. | 382/154 |
| 2012/0134580 A1* | 5/2012 | Murakami et al. | 382/163 |
| 2014/0064613 A1* | 3/2014 | Wu | G06T 5/002 382/167 |

FOREIGN PATENT DOCUMENTS

JP        07-274004 A       10/1995

* cited by examiner

*Primary Examiner* — Andrew Moyer
(74) *Attorney, Agent, or Firm* — Fitzpatrick, Cella, Harper & Scinto

(57) ABSTRACT

Edge enhancement processing is executed by obtaining a sum of whiteness degrees around a target pixel, to which edge enhancement is to be applied, and by adjusting the amount of edge enhancement such that the degree of edge enhancement decreases as the sum of whiteness degrees increases, and the degree of edge enhancement increases as the sum of whiteness degrees decreases. A whiteness degree is a value indicating the extent to which a pixel is close to white, and a sum of whiteness degrees indicates the extent to which the color around the target pixel is whitish.

9 Claims, 6 Drawing Sheets

FIG. 4
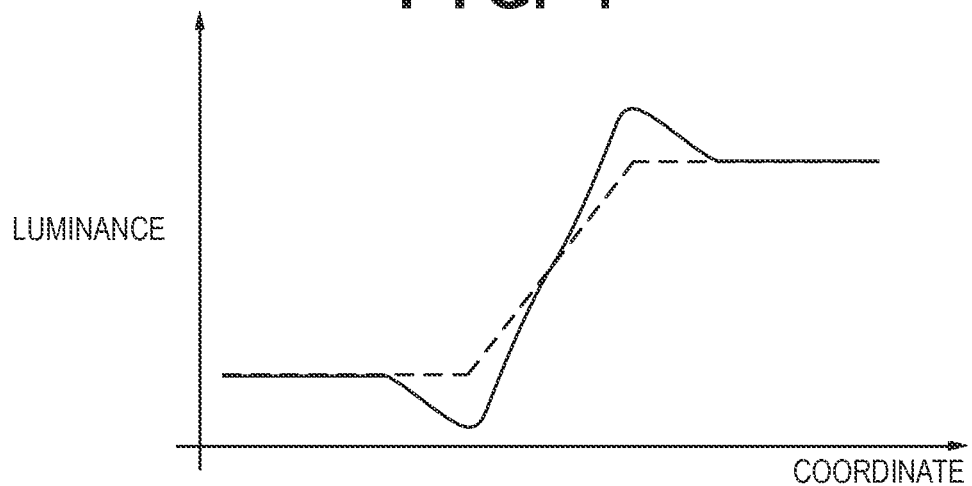
FIG. 5
FIG. 6
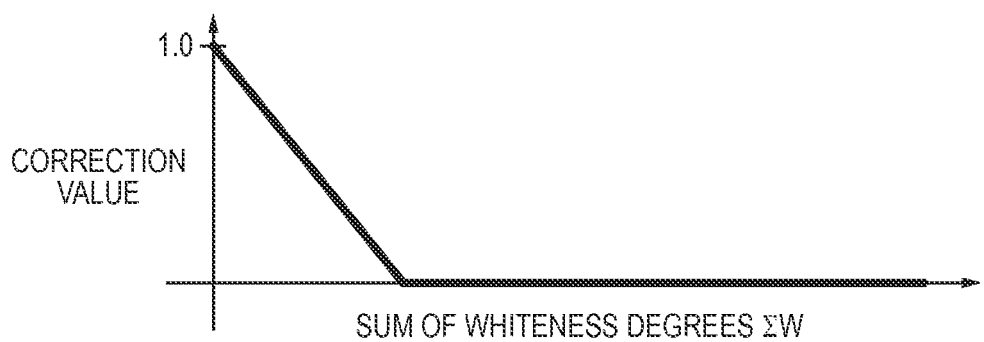

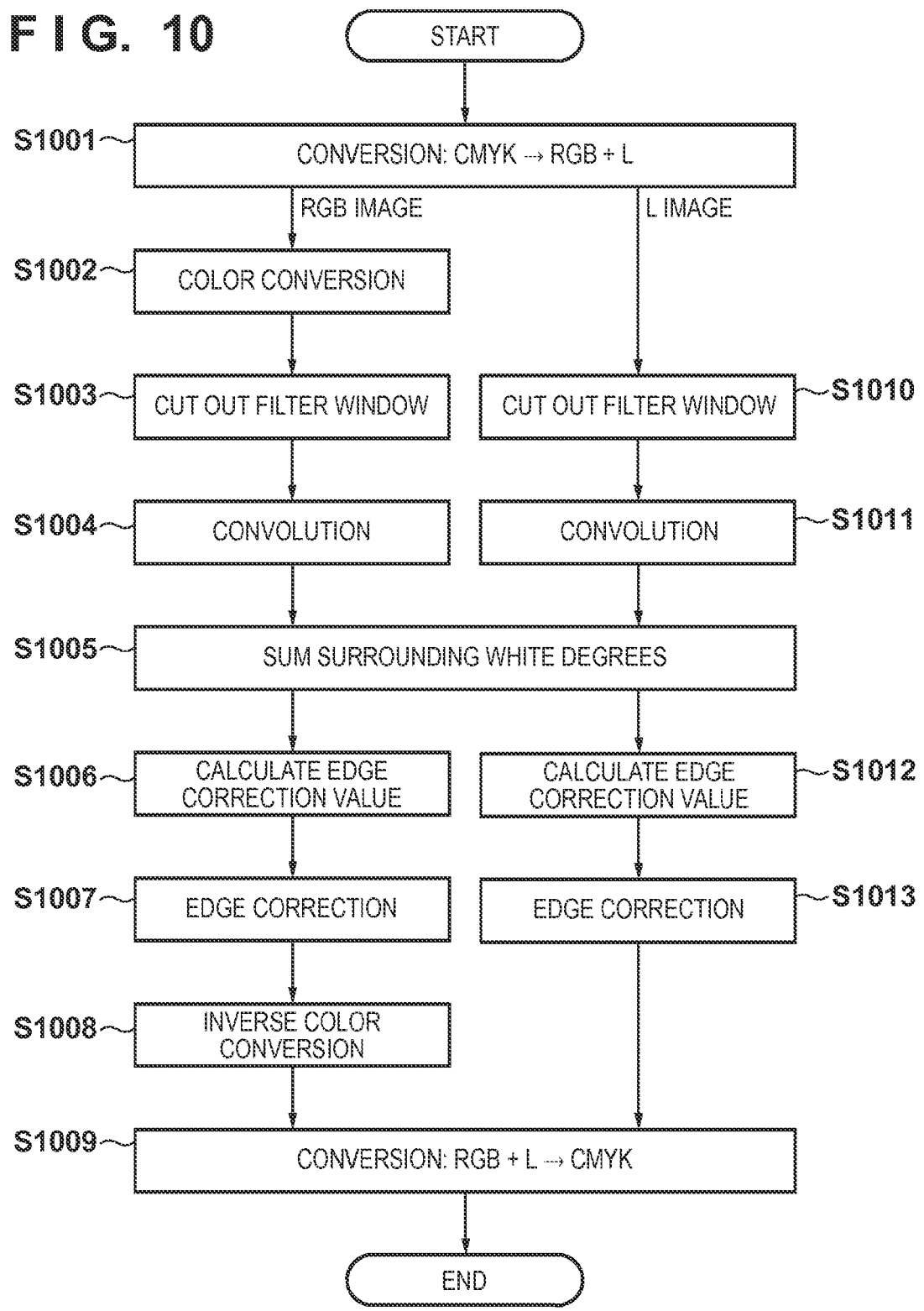

IMAGE PROCESSING APPARATUS AND IMAGE PROCESSING METHOD EACH WITH A FUNCTION OF APPLYING EDGE ENHANCEMENT TO INPUT IMAGE DATA

BACKGROUND OF THE INVENTION

Field of the Invention

The present invention relates to an image processing apparatus, an image processing method, a program, and a storage medium for executing edge enhancement processing.

Description of the Related Art

Conventionally, edge enhancement processing for an image increases the readability of an image of a character and sharpens a photograph, and hence can improve the image quality. The edge enhancement processing generally uses filter-based convolution calculation, and performs conversion such that contrast near edges is enhanced in a resultant image. More specifically, in a position where a bright region and a dark region border each other, a bright portion is converted to have higher brightness and a dark portion is converted to have lower brightness, thus emphasizing the border portion and increasing visual sharpness.

Thus far, many techniques have been disclosed in the field of edge enhancement for a color image.

There is a technique to improve the readability by detecting a black character in an image of a scanned document, applying edge enhancement to a portion including the detected black character, and printing the black character using black ink. For example, color image data is separated into luminance and saturation, a degree of black edges is obtained from an amount of edges and saturation, and enhancement processing is applied to the edges.

Also disclosed is processing for selectively controlling an amount of sharpness enhancement in such a manner that, based on a magnitude relationship with a threshold for lightness of a portion surrounding a target pixel, sharpness of a border of a one-color portion having a clear edge, such as a character and logo, is increased, whereas sharpness of a portion of other designs is suppressed (for example, see Japanese Patent Laid-Open No. H07-274004).

However, if general edge enhancement processing including the above-described techniques is applied, portions near edges may be unnaturally outlined in some cases. For example, an end of an image bordering a white background of a sheet is fundamentally not an image edge that should be enhanced, and if the edge enhancement processing is applied thereto, a portion adjacent to the white background of the sheet is outlined. While this is expected to occur on four sides of a photographic image, edges of other objects, such as a logo and a decorated character, also often border a white background of a sheet. If these edges are excessively outlined as a result of the edge enhancement processing, unnatural outlines become visible in a similar manner. Oftentimes, these image edges fundamentally have sufficient sharpness, and even if an amount of enhancement is suppressed without performing intense edge enhancement processing, they have sufficient image quality in most cases.

On the other hand, if edge enhancement is suppressed so as not to produce harmful effects associated with unnatural outlines, it is often impossible to achieve a sufficient amount of enhancement for an image in which edges should be enhanced.

SUMMARY OF THE INVENTION

The present invention has been made in view of the above-described conventional examples, and provides an image processing apparatus that applies an appropriate degree of edge enhancement processing to an image.

The present invention has the following configuration.

According to one aspect of the present invention, there is provided an image processing apparatus with a function of applying edge enhancement to input image data, comprising: a unit that obtains whiteness degrees around a target pixel; a determination unit that determines a correction value for the edge enhancement in accordance with the whiteness degrees; and a unit that applies edge enhancement processing to the target pixel at intensity corresponding to the correction value.

The present invention can suppress harmful effects associated with the application of edge enhancement processing to an image.

Further features of the present invention will become apparent from the following description of exemplary embodiments with reference to the attached drawings.

BRIEF DESCRIPTION OF THE DRAWINGS

FIG. 4 shows edge portions before and after the edge enhancement according to the first embodiment of the present invention.

FIG. 5 shows a target pixel and surrounding pixels in a window according to the first embodiment of the present invention.

FIG. 6 is a graph of a sum of whiteness degrees versus an edge correction value according to the first embodiment of the present invention.

FIG. 10 is a flowchart showing edge enhancement processing for a CMYK image according to a fourth embodiment of the present invention.

DESCRIPTION OF THE EMBODIMENTS

The following describes the best mode for carrying out the present invention with reference to the drawings.

Configuration of Image Forming Apparatus

Figure 1:
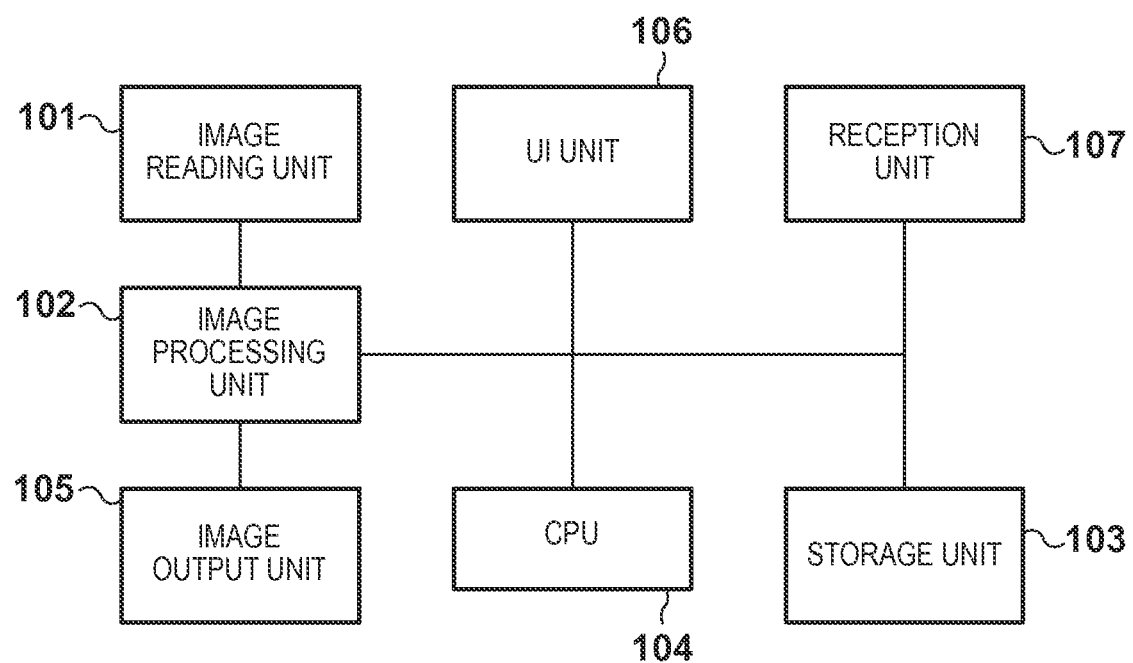
FIG. 1 is a block diagram showing a schematic configuration of an image forming apparatus according to an embodiment of the present invention.

FIG. 1 is a block diagram showing a configuration of an image forming apparatus according to the present embodiment with a function of performing edge enhancement. As shown in FIG. 1, the image forming apparatus includes an image reading unit 101, an image processing unit 102, a storage unit 103, a CPU 104, an image output unit 105, a user interface (UI) unit 106, and a reception unit 107. It should be noted that the image forming apparatus is connectable to, for example, a server that manages image data and a personal computer (PC) that issues an instruction for conducting printing via a network and the like.

The image reading unit 101 reads an image of a document and outputs image data. The image processing unit 102 converts print information, which includes image data input from the outside via the image reading unit 101, the transmission/reception unit 107 and the like, into intermediate information (hereinafter, this intermediate information is referred to as "object"), and stores the object into an object buffer of the storage unit 103. It also generates bitmap data based on the buffered object and stores the bitmap data into the buffer of the storage unit 103. At this time, color conversion processing, edge enhancement processing, and the like are executed. Specifics thereof will be described later.

The storage unit 103 is constructed by a ROM, RAM, a hard disk (HD), and the like. The ROM stores various types of control programs and image processing programs executed by the CPU 104. The RAM is used as a reference area and a working area into which the CPU 104 stores data and various types of information. The RAM and HD are used in a storage operation involving the aforementioned object buffer. Processing parameters necessary for image processing are also stored. Image data, page sorting, and documents composed of a plurality of sorted pages are accumulated in these RAM and HD so as to print out a plurality of copies.

The image output unit 105 forms a color image on a recording medium, such as a recording sheet, and outputs the recording medium. The UI unit 106 performs an operation of notifying the apparatus of instructions related to, for example, a type and level adjustment of image processing in the image processing unit. For example, it sets an amount of this adjustment of image processing. After receiving image data for printing from the outside, the transmission/reception unit 107 stores the image data for printing into the storage unit 103 or outputs the image data for printing to the output unit 105. It also transmits/output image data accumulated in the storage unit 103 to the outside of the apparatus.

General Design of Apparatus

Figure 2:
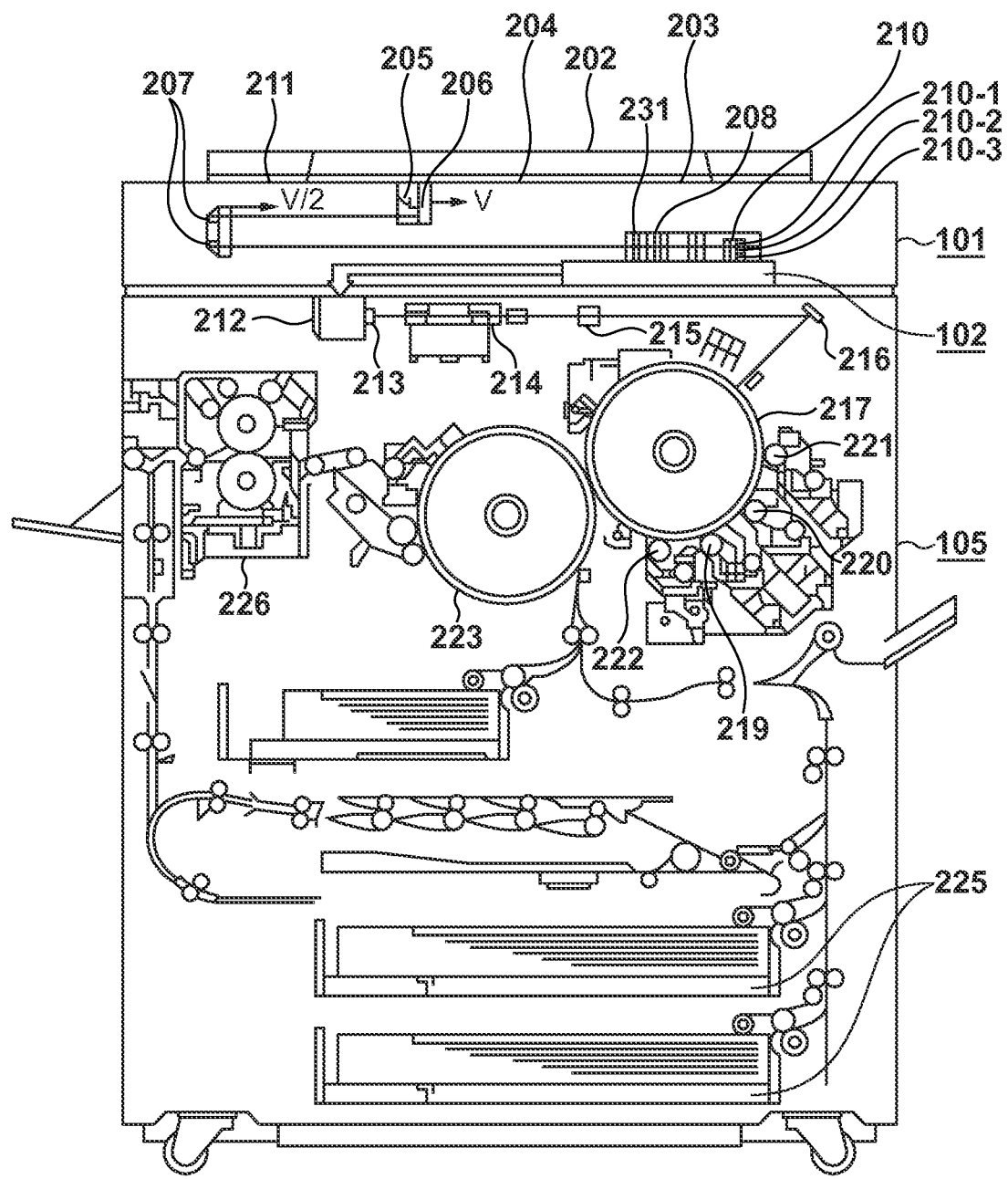
FIG. 2 shows a general design of an image forming apparatus according to an embodiment of the present invention.

FIG. 2 shows a general design of the image forming apparatus. In the image reading unit 101, a document 204 targeted for image reading is placed between a glass platen 203 and a document pressing plate 202, and then the document 204 is irradiated with light from a lamp 205. Light reflected by the document 204 is directed by mirrors 206 and 207, and an image is formed on a three-line sensor 210 via a lens 208. It should be noted that the lens 208 is provided with an infrared cut-off filter 231. A motor, which is not shown in the drawings, moves a mirror unit composed of the mirror 206 and the lamp 205 at velocity V, as well as a mirror unit composed of the mirrors 207 at velocity V/2, in the direction of arrows. That is to say, the mirror units scan the entire surface of the document 204 while moving in a direction (sub scanning direction) perpendicular to the electrical scanning direction (main scanning direction) of the three-line sensor 210.

The three-line sensor 210, which is composed of three lines of CCDs 210-1, 210-2 and 210-3, reads color components of full-color information of red (R), green (G) and blue (B) through color separation of input light information, and transmits color component signals to the image processing unit 102. It should be noted that the CCDs composing the three-line sensor 210 each have light-receiving elements corresponding to 5000 pixels, and can read a short-side direction (297 mm) of a document of A3 size, which is the largest document size that can be placed on the glass platen 203, at a resolution of 600 dpi.

A standard white plate 211 is for correcting data read by the CCDs 210-1 to 210-3 of the three-line sensor 210. The color of the standard white plate 211 is white that exhibits substantially uniform reflection characteristics with respect to visible light.

The image processing unit 102 generates color component signals corresponding to cyan (C), magenta (M), yellow (Y) and black (K) by electrically processing image signals input from the three-line sensor 210, and transmits the generated CMYK color component signals to the image output unit 105. An image output at this time is a CMYK image to which halftone processing, such as dithering, has been applied.

In the image output unit 105, a C, M, Y or K image signal transmitted from the image reading unit 101 is transmitted to a laser driver 212. The laser driver 212 performs modulation driving of a semiconductor laser element 213 in accordance with the input image signal. A laser beam output from the semiconductor laser element 213 scans a photosensitive drum 217 via a polygonal mirror 214, f-θ lens 215 and mirror 216 so as to form an electrostatic latent image on the photosensitive drum 217.

A developer is composed of a magenta developer 219, a cyan developer 220, a yellow developer 221 and a black developer 222. The electrostatic latent image formed on the photosensitive drum 217 is developed using toner of a corresponding color by the four developers alternately coming into contact with the photosensitive drum 217; as a result, a toner image is formed. A recording sheet supplied from a recording sheet cassette 225 is wound around a transfer drum 223, thereby causing the toner image on the photosensitive drum 217 to be transferred onto the recording sheet.

After toner images of four colors C, M, Y and K are successively transferred onto the recording sheet in the above-described manner, the recording sheet passes through a fixing unit 226 to fix the toner images thereon and then is discharged to the outside of the apparatus.

Edge enhancement processing applied by the image processing unit 102 to an image will be described below in detail as a characteristic feature of the present invention with reference to FIG. 3. The processes of the following flow are executed by the image processing unit 102 in response to an instruction from the CPU 104.

First, in step S301, the image processing unit 102 applies a color conversion process to input RGB image data so as to perform color conversion into a color space of a luminance-color difference system, more specifically, color conversion from RGB components into YCbCr. Color conversion expressions are presented below.

$$Y = 0.2990*R + 0.5870*G + 0.1140*B$$

$$Cb = -0.1687*R - 0.3313*G + 0.5000*B$$

$$Cr = 0.5000*R - 0.4187*G - 0.0813*B \qquad (1)$$

Under the assumption that signal values corresponding to red, green and blue in the input RGB image are respectively noted as R, G and B (the signal values fall in a range of 0 to 255 in the case of, for example, an 8-bit signal), the RGB components are converted into Y (0 to 255), Cb (−128 to 127) and Cr (−128 to 127). As a result of this conversion, the input RGB image is separated into luminance Y and color differences Cb, Cr.

Next, in step S302, the image processing unit 102 cuts out a window of a certain size with respect to the YCbCr signal including luminance information and color difference information obtained in the previous process. In the present embodiment, it is assumed that the size of this window is 5×5.

Next, in step S303, the image processing unit 102 performs edge enhancement by applying filter convolution to the signal of luminance Y included in the window obtained in the previous process. As a general method, a second-order differential component is calculated using a Laplacian filter, and a value thereof is subtracted from a signal value of an original image. As one example, the following filter matrix is used to realize this process in a single convolution operation.

| −0.09 | −0.18 | −0.27 | −0.18 | −0.09 |
|-------|-------|-------|-------|-------|
| −0.18 | 0.09  | 0.36  | 0.09  | −0.18 |
| −0.27 | 0.36  | 2.08  | 0.36  | −0.27 |
| −0.18 | 0.09  | 0.36  | 0.09  | −0.18 |
| −0.09 | −0.18 | −0.27 | −0.18 | −0.09 |

The size of this filter matrix needs to be equal to or smaller than the size of the window cut out in the previous process. This process is performed only for luminance Y, and is not performed for color differences Cb, Cr. In this way, only brightness is enhanced, and a change in the color of edge portions can be suppressed to some extent. A luminance signal thus obtained after the edge enhancement will hereinafter be noted as Y'.

FIG. 4 is a two-dimensional graph showing a change in luminance as a result of this process. A dashed line represents a value of an input luminance signal Y, whereas a solid line represents a value of an output luminance signal Y'. As indicated by the graph, a change in luminance creates contrast such that a dark portion becomes darker and a bright portion becomes brighter.

Next, in step S304, the image processing unit 102 sums whiteness degrees of pixels surrounding a target pixel with respect to the window cut out in the process of step S302. Herein, a whiteness degree is defined as being related to a portion with low saturation and high luminance, a value of a pixel in that portion is set to be high, and values of surrounding pixels are cumulatively summed. At this time, saturation S is calculated using the values of color differences Cb, Cr. As stated earlier, color differences Cb, Cr denote color components, and a distance from (Cb, Cr)=(0, 0) represents sharpness. Therefore, saturation S is obtained using the following expression.

$$S=\sqrt{(Cb^2+Cr^2)} \quad (2)$$

As a result, based on Y and S, a whiteness degree W is obtained using, for example, the following expression.

$$W=Y^2+(255-S)^2 \quad (3)$$

As indicated by this expression, luminance increases as a value of Y increases, and saturation increases as a value of S increases. In other words, saturation decreases as the result of 255−S increases. Therefore, the value of the whiteness degree W of a certain pixel increases as luminance and saturation of the certain pixel increase and decrease, respectively. Considering that a high-luminance achromatic color is white, a value W indeed indicates a whiteness degree. Values W thus obtained on a periphery of the window are cumulatively summed. FIG. 5 shows an exemplary case where the summation is performed with respect to 16 pixels around the target pixel. In this figure, • represents the target pixel, and x represents the 16 pixels around the target pixel. A sum of whiteness degrees thus obtained is noted as ΣW. As a value of this ΣW is obtained by cumulative summation, in the case where, for example, four sides shown in FIG. 5 are white, the value of ΣW is four times larger than the value of ΣW for the case where only one side is white. In the above-described manner, the extent of whiteness, i.e., a sum of whiteness degrees ΣW of a pixel group surrounding the target pixel is obtained.

Next, in step S305, the image processing unit 102 calculates a correction value for correcting an amount of edge enhancement in accordance with the value of ΣW obtained in the previous process. As mentioned earlier, if an edge adjacent to a background of a sheet is outlined, there is a high possibility of occurrence of an image defect, and therefore it is necessary to suppress the edge enhancement therefor. That is to say, the larger the value of ΣW is, the more the target pixel is expected to be surrounded by the background of the sheet, which is white, and the more it is necessary to decrease the amount of edge enhancement. A correction value α is a positive value equal to or smaller than 1.0, and is defined as a value that does not require correction if it is 1.0 and requires more correction as it decreases. Conversion is performed using a curve based on the input ΣW shown in FIG. 6. This curve is exemplarily used herein because, provided that the edge enhancement is not performed if at least one edge of the window is white, a correction value α needs to stay at 0 at some point along the curve. As this curve is determined in consideration of balance between the improvement and defect of an image attributed to the edge enhancement processing, it is possible to, for example, allow a user to designate a sum of white degrees ΣW that realizes a correction value α of 0 as a parameter, thereby making the curve to correspond to the designated parameter; in this way, a preferred curve can be changeably set.

In this manner, a correction value α is determined as a function of a sum of whiteness degrees ΣW. While the function of FIG. 6 can be achieved using a mathematical expression, the present process uses a lookup table (LUT) based on an input signal value ΣW instead of using a mathematical expression of some sort in the present example. It should be noted that this LUT is stored in the storage unit 103 and loaded during the present process.

Also, the present example has illustrated an LUT in which the correction value α continuously changes with respect to a change in ΣW. As a simpler implementation method, it is possible to execute threshold processing for, for example, reducing α if ΣW exceeds a certain value. However, in the case of a gradation image in which white gradually changes, this method changes the degree (intensity) of edge enhancement at some point, and such a change undesirably becomes visible. For this reason, it is preferable that α continuously change with respect to the change in ΣW, and this is why the above-described operation is implemented.

Next, in step S306, the image processing unit 102 obtains final luminance Y" by performing edge correction based on the correction value α obtained in the previous process, the post-enhancement luminance Y' obtained in step S303, and luminance Y of the original image obtained in step S301. The final luminance Y" is obtained by linear interpolation using the following calculation.

$$Y''=(1.0-\alpha)*Y+\alpha*Y' \quad (4)$$

Figure 7:
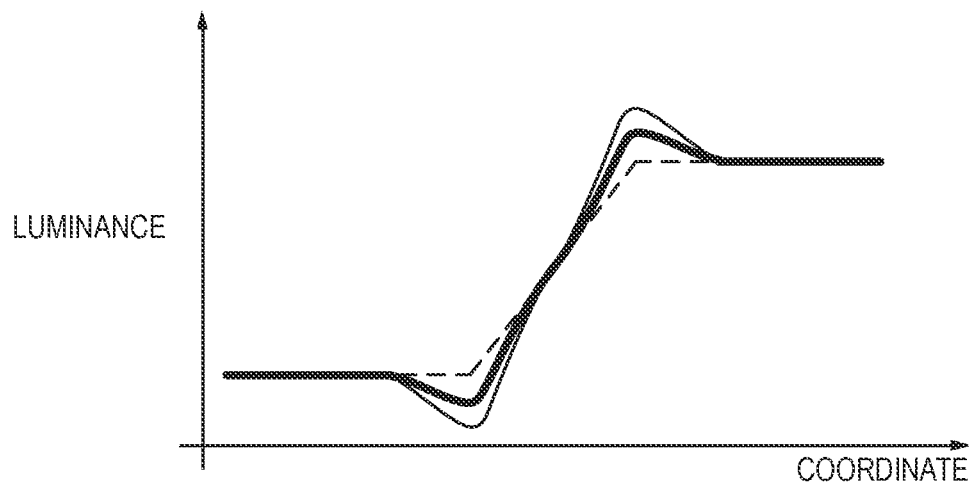
FIG. 7 shows edge portions before and after the edge enhancement according to the first embodiment of the present invention.

As the maximum value of the correction value α is 1.0, with the calculation of Expression (4), the output is obtained by alpha-blending the two signals. As opposed to the conventional edge enhancement processing that yields the result shown in FIG. 4, the present embodiment makes it possible to obtain the output indicated by a thick line in FIG. 7 when the correction value α is 0.5. It is apparent from the thick line that the degree of edge enhancement is suppressed.

Finally, in step S307, the image processing unit 102 performs conversion into RGB for output. This calculation corresponds to calculation of an inverse matrix for the color conversion performed in step S301, and uses the following expressions.

$$R=Y''+1.4020*Cr$$

$$G=Y''-0.3441*Cb-0.7141*Cr$$

$$B=Y''+1.7720*Cb \quad (5)$$

Through the above-described flow, in the case of an image including an edge that borders a background of a sheet, an edge portion is prevented from being unnaturally outlined, and therefore a resultant RGB color image obtained reflects preferred edge enhancement.

Figure 3:
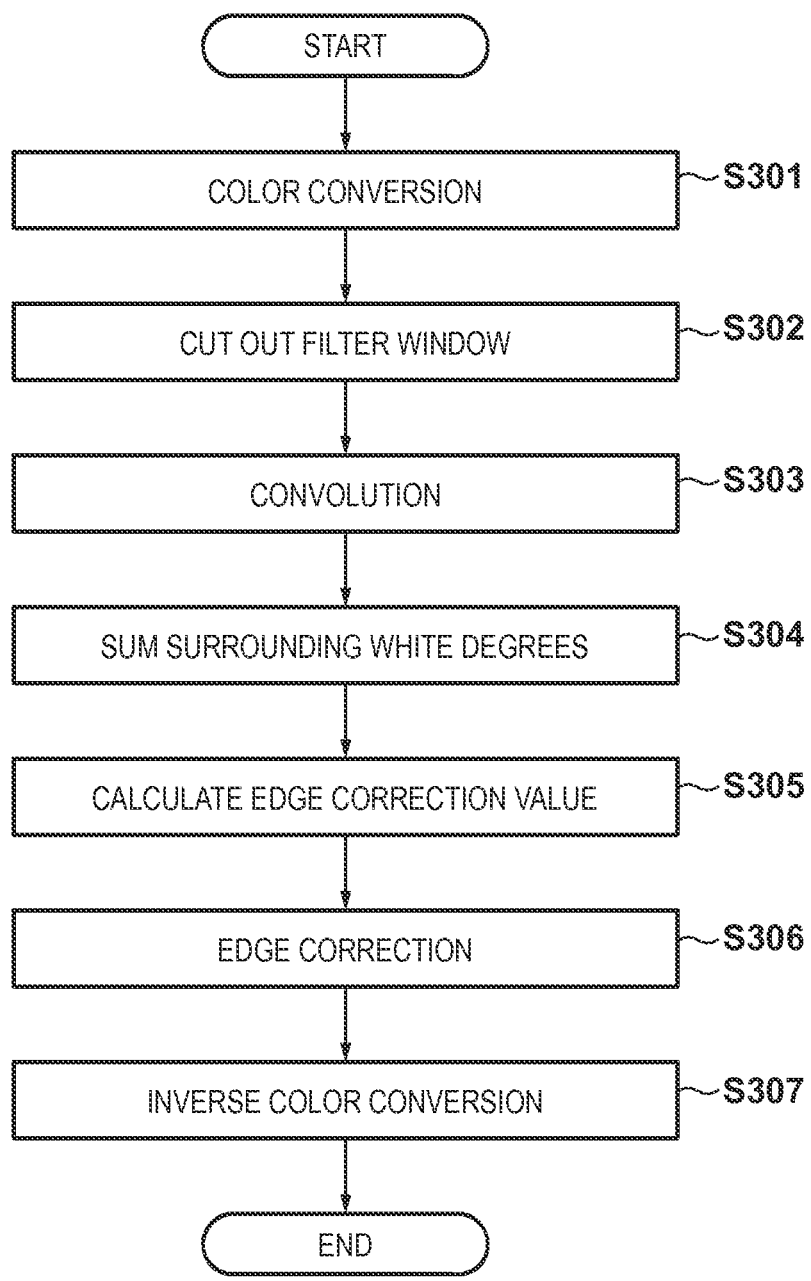
FIG. 3 is a flowchart showing edge enhancement processing according to a first embodiment of the present invention.

The edge enhancement processing is applied to the entire image by executing the processes of steps S301 to S307 in FIG. 3 with all of the pixels composing the image data regarded as target pixel values.

In the edge enhancement processing realized in accordance with the above-described configurations and procedure, edge enhancement is not performed in a uniform fashion, but is adaptably performed at the intensity corresponding to the whiteness degrees of surrounding pixels. This makes it possible to realize prevention of unnatural outlines attributed to the edge enhancement, as well as improvements in image quality due to the increased sharpness attributed to the edge enhancement.

While the present embodiment uses the YCbCr color space of the luminance-color difference system as a color space targeted for the edge enhancement, similar results can be yielded with respect to other color spaces of the luminance-color difference system, such as the L*a*b* color space. Similarly, an edge enhancement technique is not limited to the above-described technique, and unsharp masking and the like may be used.

While a whiteness degree W is calculated using Y and S in the present embodiment, the whiteness degree W may be derived only from the value of Y as RGB components are sufficiently reflected in the Y signal. In other words, if Y has a sufficiently large value, it can be regarded as white. In this case, for example, a sum of luminance values Y of pixels surrounding a target pixel, i.e., ΣY is calculated in place of ΣW in step S304, and the sum of luminance values ΣY is used as a horizontal axis of the function of FIG. 6.

Furthermore, while the values of the whiteness degrees W of 16 pixels surrounding the target pixel are directly summed as ΣW in the present embodiment, it is possible to adopt a method for applying threshold processing to each of the values of the whiteness degrees W of pixels and using the number of the pixels as ΣW, a method for counting the continuation of pixels to which the threshold processing has been applied, and the like.

Furthermore, while the sum of whiteness degrees ΣW is obtained by summing the values of the whiteness degrees W of 16 pixels surrounding the target pixel in the present embodiment, it is possible to adopt other methods, for example, a method that uses only four pixels on the vertexes of 5×5 pixels so as to simplify the calculation. In this way, a calculation procedure is simplified and the processing load can be reduced.

Second Embodiment

In the first embodiment, a uniform filter matrix and a uniform correction value are calculated for an entire image. However, if the attribute of the image, such as an image of a character, a photographic image, and a graphic image of vector drawing, is known in advance, image quality can be further improved by switching to processing appropriate for the image. In addition to the attribute, the range of adjustment is expanded by allowing the user to designate a desired level of application of edge enhancement using a UI. In view of this, the present embodiment describes a configuration that allows switching among edge enhancement levels by switching among filter matrixes and correction values in accordance with a setting value. Below, a description related to the configurations and general design of the image forming apparatus similar to those of the first embodiment, as well as a description of a flow that has already been described, will be omitted, and a flow of edge enhancement coefficient calculation will be described as a feature.

Figure 8:
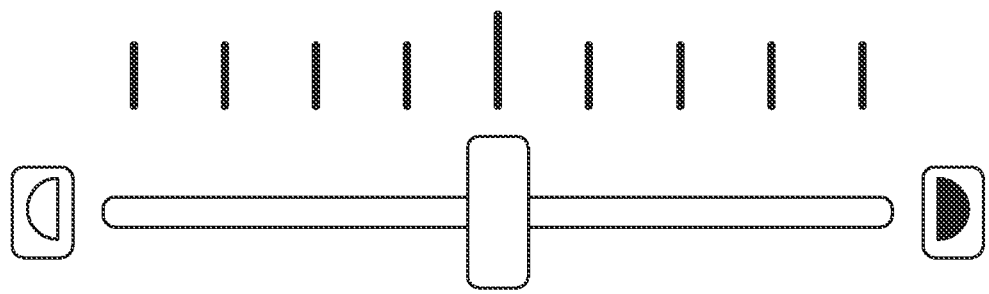
FIG. 8 shows a UI unit according to a second embodiment of the present invention.

An edge enhancement level is changed via the UI unit 106 using a UI shown in FIG. 8. The edge enhancement is increased by moving a slide bar shown in this figure to the right, and decreased by moving the slide bar to the left. A setting value thus configured is temporarily stored in the storage unit 103, and parameters for the edge enhancement processing are changed by referring to this setting value. This setting value is negative on the left side of a normal state, and positive on the right side of the normal state. According to this figure, there are four levels of adjustment both in the positive direction and in the negative direction. In the following example, markings of the user interface shown in FIG. 8 are coefficients indicating the degrees of edge enhancement, with a central marking indicating 1, markings on the left indicating positive decimal numbers smaller than 1, and markings on the right indicating numbers larger than 1; for example, −0.1 and 0.1 are added upon movement away from the central value 1 by one marking in the leftward direction and the rightward direction, respectively. It should naturally be appreciated that the foregoing is merely an example.

The degree of edge enhancement is changed by changing the coefficients of the filter matrix used in step S303 and the correction value used in step S306 in accordance with the coefficients thus designated using the UI. These parameters are changed in accordance with the setting value indicating the edge intensity configured via the UI unit 106 and held in the storage unit 103. If this setting value is negative, that is to say, if somewhat weak edge enhancement is selected, convolution coefficients of the filter used in step S302 described in the first embodiment are uniformly multiplied by a value equal to or smaller than 1. For example, if the convolution coefficients are multiplied by 0.8, the following results are yielded.

| −0.072 | −0.144 | −0.216 | −0.144 | −0.072 |
|---|---|---|---|---|
| −0.144 | 0.072 | 0.288 | 0.072 | −0.144 |
| −0.216 | 0.288 | 1.664 | 0.288 | −0.216 |
| −0.144 | 0.072 | 0.288 | 0.072 | −0.144 |
| −0.072 | −0.144 | −0.216 | −0.144 | −0.072 |

If the convolution is performed using the above coefficients, the values become small and the image darkens as a whole; in view of this, the central coefficient 1.664 is offset such that the sum of the matrix becomes 1.0. More specifically, the sum becomes 1.0 by offsetting the central coefficient by 0.2, that is to say, by changing the central coefficient to 1.864. Ultimately, the edge enhancement processing is executed using the following filter.

| | | | | |
|---|---|---|---|---|
| −0.072 | −0.144 | −0.216 | −0.144 | −0.072 |
| −0.144 | 0.072 | 0.288 | 0.072 | −0.144 |
| −0.216 | 0.288 | 1.864 | 0.288 | −0.216 |
| −0.144 | 0.072 | 0.288 | 0.072 | −0.144 |
| −0.072 | −0.144 | −0.216 | −0.144 | −0.072 |

With this calculation, coefficients for somewhat weak edge enhancement can be obtained.

The edge enhancement is weakened similarly by multiplying a correction value a for a luminance value used in step S305 by a coefficient equal to or smaller than 1.

Conversely, if the setting value is positive, that is to say, if somewhat intense edge enhancement is selected, coefficients for somewhat more intense edge enhancement can be obtained by multiplying LUT components by a coefficient value equal to or larger than 1 and similarly offsetting the central coefficient such that the sum becomes 1.0. The same goes for the correction value a used in step S305.

The above-described weighting for LUT elements is equivalent to increasing/decreasing the central weight for convolution, and the more the surrounding weights are, the more the edge is enhanced. Conversely, the more the central weight is, the lower the degree of edge enhancement is. In this manner, the edge enhancement level can be changed by performing simple calculation with respect to a filter matrix and a correction value.

While the present embodiment has described an exemplary process for switching among the intensities in accordance with a setting value configured using the UI, it is possible to switch among the levels in accordance with the attribute of an image, as mentioned in the beginning of the present section, and further to configure different setting values for different attributes using the UI. In the present example, it is preferable that the attributes be classified based on whether or not there are many portions in white (that is to say, the color of a background of a sheet) as a background of an object composing the edge. For example, as a character and a drawing of a line are expected to include many edges whose background is the sheet (that is to say, white), they can be classified as a single attribute, and objects other than a character and a drawing of a line can be classified as another single attribute. If the original image data is described in, for example, a page description language for printing, the attribute of an image can be classified in accordance with an instruction used therein. On the other hand, in the case of image data that has been, for example, read as dot data, the attribute of an image can be detected by analyzing the edges and the like. Under such circumstances, one image may be divided into regions of different attributes, in which case it is possible to set the degree of edge enhancement using an LUT or a UI for edge enhancement in accordance with the attribute on a region-by-region basis.

Third Embodiment

The first and second embodiments have not discussed the difference between the resolution of the output from the transmission/reception unit 107 and the image output unit 105 and the resolution at which the edge enhancement processing is executed. The degree of edge enhancement varies significantly depending on the difference between the resolution for processing and the resolution of the output. For example, if a low-resolution image is enlarged and output after intense edge enhancement is applied thereto, outlines become more easily visible, and the entire image becomes noisy. Conversely, if somewhat weak edge enhancement is applied to a high-resolution image, the effects of such edge enhancement are hardly noticeable in many cases. In view of this, the present embodiment describes a configuration that allows switching among edge enhancement levels in accordance with the resolution of the output and the resolution of the input. Below, a description related to the configurations and general design of the image forming apparatus similar to those of the first embodiment, as well as a description of a flow that has already been described, will be omitted, and a description will be given with reference to the flow of edge enhancement coefficient calculation that has been described in the second embodiment.

In general, the resolution of read data from the image reading unit 101 is fixed in the apparatus or comes in several patterns; for example, reading is performed at a relatively high resolution, such as 600 dpi. This resolution is necessary for resolving an image of a character and the like. Likewise, the resolution of the printout from the image output unit 105 is generally fixed in the apparatus or prepared in several patterns.

However, if the apparatus is connected to the outside via a network and the like, image data received therefrom via the reception unit 107 could possibly have different resolutions depending on the original data in a transmission source. The image processing unit 102 applies enlargement or reduction processing to the image data so as to make the image data conform to the resolution of the printout. As described above, there is a problem of intense edge enhancement for the case where the resolution of the received image data is too low, and conversely weak edge enhancement for high-resolution image data.

The present embodiment describes a configuration for scaling image data to the resolution of the output after executing the edge enhancement processing. It should be noted that the processing order is by no means limited to the one described below.

The previous embodiment has described, as an example, conversion based on a setting value configured via the UI unit 106 in relation to the configuration for changing the degree of edge enhancement by changing the coefficients of the filter matrix used in step S302 and the correction value used in step S306. While similar processing is executed in the present embodiment, the setting value indicating the edge intensity is changed based on resolution information of a received image instead of the setting value configured via the UI unit 106 in the present example.

As described in the previous embodiment, different effects are achieved depending on whether the coefficients of the filter matrix in step S302 and the correction value in step S306 are multiplied by a value larger or smaller than 1.0. In view of this, a table associating a multiplier β with resolution is held in the storage unit 103, and the coefficients of the filter matrix and the correction value are converted in accordance with resolution identified with reference to the table.

Figure 9:
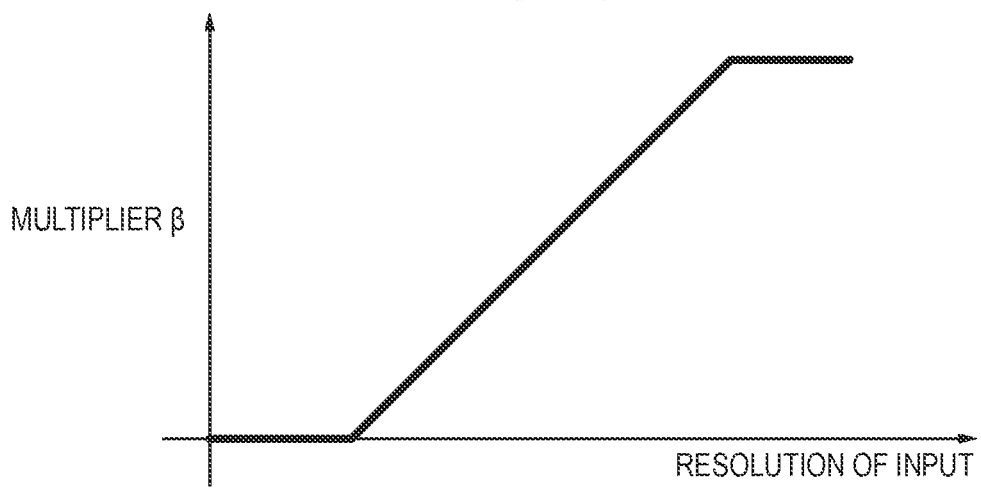
FIG. 9 is a graph of a multiplier $\beta$ versus the resolution of input according to a third embodiment of the present invention.

FIG. 9 shows an example of the table. The value of the multiplier β increases as the resolution of the input increases. Also, if the resolution equals or falls below a certain resolution threshold, the multiplier β converges to a lower limit (for example, 0). In this case, the multiplier is 0, and therefore the result is equivalent to execution of no processing. For example, in the case where the input has a resolution of 10 dpi and the output has a resolution of 600 dpi, an input image is enlarged to 60 times its size, and if the edge enhancement is applied to such an image, the width of an enhanced edge is increased, thereby negatively affecting the image quality; for this reason, the multiplier is converged to 0 for an excessively low resolution.

Conversely, in the case where the resolution of the input is high, although it is necessary to perform considerably intense edge enhancement, the multiplier is converged to a certain upper limit because extreme enhancement would trigger coloration differences. The value of the coefficient β is determined in accordance with the degree of edge enhancement performed without multiplying the coefficient β. If the degree of edge enhancement performed without multiplying the coefficient β is sufficiently high, the upper limit of β may be set to, for example, 1, and the value of β may fall in a range of 0 to 1. Alternatively, for example, a coefficient β of 1 may serve as an intermediate value, and β may fall in a range of 0 to 2. In any case, the range of the value of the coefficient β can be determined in accordance with the degree of edge enhancement performed when β=1. By executing the processing with the obtainment of the resolution of the input and the multiplier β included in the table for the filter matrix and the correction value, it is possible to execute image processing for optimal edge enhancement corresponding to the resolution of the input.

While a description of a process for switching among the edge enhancement levels in accordance with the setting value configured via the UI unit has been omitted in the present embodiment, it is permissible to calculate the coefficients of the filter matrix and the correction value based on both of the resolution of the input and the setting value configured using the UI by further multiplying the above-described β by a coefficient for level switching corresponding to the setting value configured using the UI.

Moreover, the present embodiment may be combined with the adjustment of the coefficient for the edge enhancement using the user interface according to the second embodiment.

Fourth Embodiment

While an RGB image is input according to the description of the first embodiment, CMYK image data, which is a signal related to ink density, can be processed as well. It should be noted that, in order to avoid confusion of yellow components Y and a luminance signal Y, the yellow components Y are noted as Ye in the present embodiment. The present embodiment describes a configuration that allows application of edge enhancement to an input CMYeK image. Below, a description related to the configurations and general design of the image forming apparatus similar to those of the first embodiment, as well as a description of a flow that has already been described, will be omitted.

A description is now given of a flow according to the present embodiment with reference to FIG. 10. It should be noted that the processes of steps S1002 to S1008 are completely equivalent to those of steps S301 to S307 in the flow of FIG. 3 that has already described in the first embodiment, and therefore a description thereof will be omitted below. Similarly to conventional embodiments, the following processes are executed by the image processing unit 102 in response to an instruction from the CPU 104.

In step S1001, the image processing unit 102 separates an input CMYeK image into CMYe and K, and converts a CMYe signal and a K signal into an RGB signal and an L signal, respectively. More specifically, the following expressions enable conversion into RGB and L.

$R=255-C$ $G=255-M$ $B=255-Ye$ $L=255-K$ \hfill (6)

This calculation is based on the premise that C, M, Ye and K are each an 8-bit signal data for reproducing 256 gradations. In Expression (6), the value of the minuend, 255, is replaced with $2^{d-1}$ in accordance with the number of bits d. Through the flow of steps S1002 to S1008, an R'G'B' image to which the edge enhancement has been applied can be obtained from RGB.

In parallel with these processes, as shown in FIG. 10, the processes of steps S1010 to S1013 are executed with respect to the L image, which are obtained by eliminating, from the flow for the input RGB, the processes of color conversion in step S1002 and inverse color conversion in step S1008. These processes of color conversion and inverse color conversion are eliminated because they cannot be executed with respect to the single-channel L signal.

Regarding the process of step S1005, in the first embodiment, the whiteness degrees W of the pixels surrounding the target pixel are calculated based on the luminance signal Y and the color difference signals Ca, Cb in detection of white surrounding the target pixel; in contrast, in the present embodiment, it is necessary to calculate the whiteness degrees W by additionally using the L signal. More specifically, the whiteness degrees W are calculated using the following expression.

$W=Y^2+L^2+(255-S)^2$ \hfill (7)

It should be noted that luminance Y and saturation S are obtained in the same manner as in the first embodiment. As L information is a complement of K information, it can be said that the whiteness degrees are determined based on luminance information and K information.

The processes of steps S1010, S1011 and S1012 are completely the same as those of steps S1003, S1004 and S1006 for RGB, respectively. Based on the correction value obtained as a result of these processes, edge correction is applied to the L image signal in step S1013, with the result that the processed L image signal is obtained as L'.

In step S1009, the image processing unit 102 converts R'G'B' and L' thus obtained back to the CMYeK image. More specifically, conversion is performed using the following expressions.

$C'=255-R'$ $M'=255-G'$ $Ye'=255-B'$ $K'=255-L'$ \hfill (8)

This configuration makes it possible to apply preferred edge enhancement processing to the input CMYK image, similarly to the case of the input RGB image described in the preceding first embodiment. It should be noted that CMYK can be converted into RGB using other methods. For example, the edge enhancement can also be performed using the following conversion.

$R=255-\mathrm{Min}(255,C+K)$ $G=255-\mathrm{Min}(255,M+K)$ $B=255-\mathrm{Min}(255,Ye+K)$ \hfill (9)

Furthermore, one or both of the second and third embodiments can be applied to the present embodiment. In this case, RGB image data targeted for the edge enhancement processing is replaced with YMCK image data, and the resultant effects are similar to those of the above-described embodiments.

As set forth above, according to the above-described embodiments, it is possible to apply, to image data, edge enhancement processing in which the degree of edge enhancement is adaptively changed in accordance with the whiteness degrees of pixels surrounding the target pixel. In this way, for example, the degree of edge enhancement can be further decreased for a pixel surrounded by pixels of high whiteness degrees, and conversely, the degree of edge enhancement can be further increased for a pixel surrounded by pixels of low whiteness degrees. Consequently, necessary and sufficient edge enhancement can be realized in accordance with the whiteness degrees of surrounding pixels, and it is possible to, for example, prevent an image from becoming unnatural due to excessive enhancement of edges of the image drawn on a white background. Also, by enabling the adjustment of the degree of edge enhancement using the user interface, more appropriate edge enhancement can be realized. Furthermore, by enabling the adjustment of the degree of edge enhancement on a per-image attribute basis, edge enhancement corresponding to an object type can be realized. In this case, different filters can be used for different attributes, which makes it more possible to perform appropriate edge enhancement on a per-image attribute basis, that is to say, on a per-type basis. Moreover, by adjusting the degree of edge enhancement in accordance with the resolution of input image data such that the degree of edge enhancement is decreased for a low-resolution image, it is possible to prevent deterioration in image quality attributed to excessive edge enhancement.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-126124, filed Jun. 14, 2013 which is hereby incorporated by reference herein in its entirety.

What is claimed is:

1. An image processing apparatus, comprising:
at least one processor functioning as:
a processing unit that performs edge enhancement processing for an edge portion in an image; and,
an output unit that outputs an image for which the edge enhancement processing has been performed by the processing unit,
wherein the processing unit decreases the edge enhancement processing to be applied to a target pixel which is an edge portion in an image, based on a sum of values indicating brightness of the plurality of pixels around the target pixel,
wherein
the plurality of pixels around the target pixel are pixels on four vertexes of an area consisting of n×n pixels that include the target pixel at a center.

2. The image processing apparatus according to claim 1, wherein
the plurality of pixels around the target pixel are 16 pixels on a periphery of 5×5 pixels that include the target pixel at a center.

3. The image processing apparatus according to claim 1, wherein
the image data is RGB image data, and the edge enhancement processing is executed with respect to luminance values obtained from RGB components.

4. The image processing apparatus according to claim 1, wherein
the image data is CMYK image data,
the image processing apparatus further comprises a conversion unit that converts the image data into RGB image data,
the number of white pixels in the plurality of pixels around the target pixels is obtained based on at least luminance values of pixels around the target pixel and on a K value of the CMYK image data, the luminance values being obtained from RGB components, and
the edge enhancement processing is executed with respect to the luminance values and the K value.

5. The image processing apparatus according to claim 1, further comprising
a receiving unit that receives an instruction related to an edge enhancement level, wherein
the processing unit determines a correction value for an amount of the edge enhancement in accordance with the edge enhancement level received.

6. The image processing apparatus according to claim 1, further comprising
an identification unit that identifies a resolution of the image data, wherein
the processing unit determines the degree of the edge enhancement in accordance with the resolution.

7. An image processing method, comprising:
performing edge enhancement processing for an edge portion in an image; and
outputting the image for which an edge enhancement processing has been performed,
wherein the edge enhancement processing to be applied to a target pixel which is an edge portion in an image decreases, based on a sum of values indicating brightness of the plurality of pixels around the target pixel,
wherein the plurality of pixels around the target pixel are pixels on four vertexes of an area consisting of n×n pixels that include the target pixel at a center.

8. A non-transitory computer-readable medium storing a program for causing a computer to execute an image processing method, the method comprising:
performing edge enhancement processing for an edge portion in an image and
outputting the image for which an edge enhancement processing has been performed, wherein the edge enhancement processing to be applied to a target pixel which is an edge portion in an image decreases, based on a sum of brightness values indicating brightness of the plurality of pixels around the target pixel, wherein the plurality of pixels around the target pixel are pixels on four vertexes of an area consisting of n×n pixels that include the target pixel at a center.

9. The image processing apparatus according to claim 1, wherein the processing unit suppresses the edge enhancement processing as the sum of brightness is larger.

* * * * *